Jan. 10, 1956
N. LANGER
2,730,161
HEAT SEALING MACHINE OF THE THERMAL
IMPULSE TYPE AND METHOD
Filed Nov. 10, 1951
2 Sheets-Sheet 1
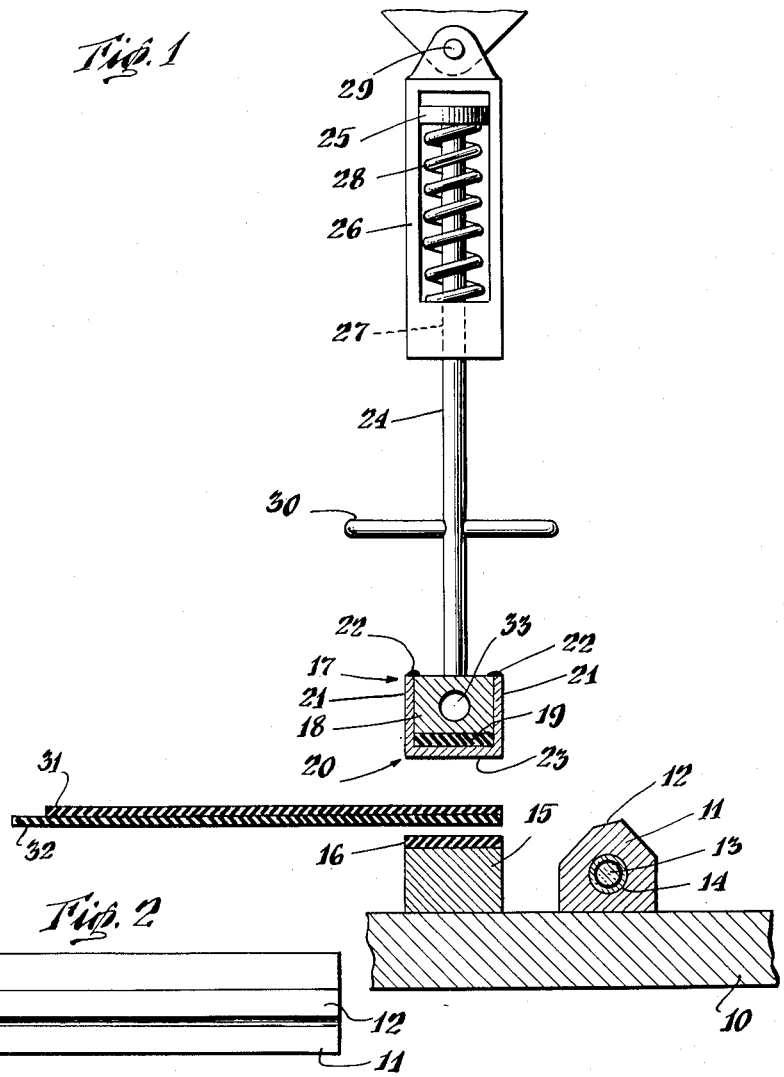
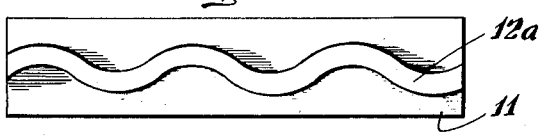
INVENTOR.
Nicholas Langer Jan. 10, 1956 — N. LANGER — 2,730,161
HEAT SEALING MACHINE OF THE THERMAL IMPULSE TYPE AND METHOD
Filed Nov. 10, 1951
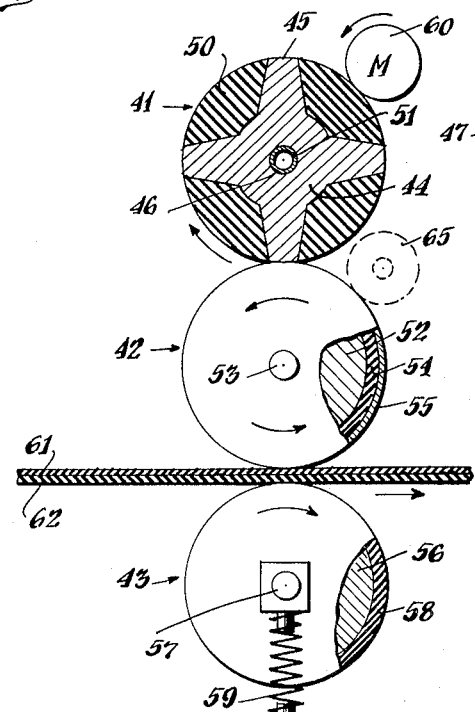
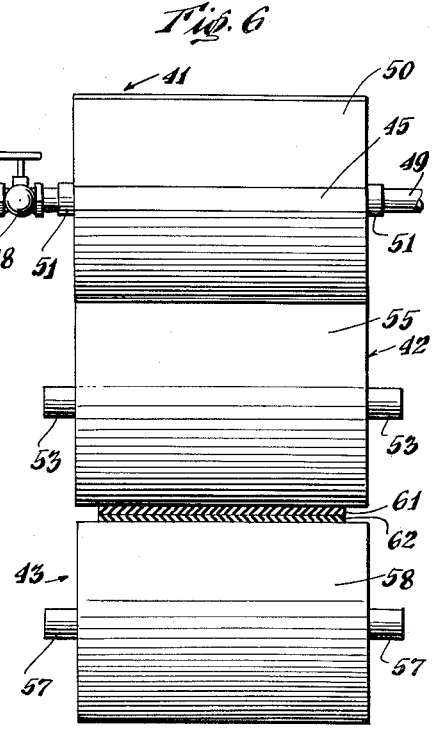
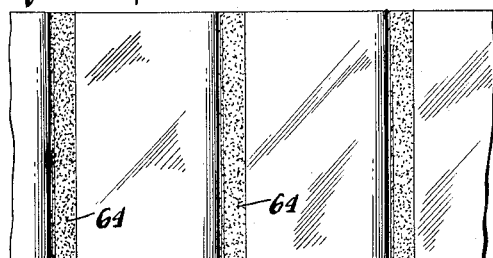
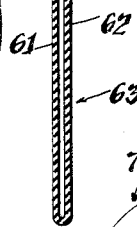
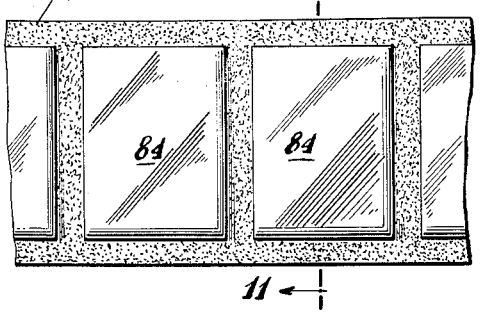
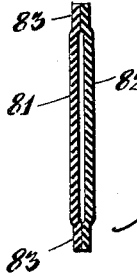
INVENTOR.
Nicholas Langer

United States Patent Office 2,730,161
Patented Jan. 10, 1956

2,730,161

HEAT SEALING MACHINE OF THE THERMAL IMPULSE TYPE AND METHOD

Nicholas Langer, New York, N. Y.

Application November 10, 1951, Serial No. 255,777

11 Claims. (Cl. 154—42)

This invention relates to the art of bonding thermoplastic materials, such as thermoplastic layers and films, and, more particularly, to a novel and improved heat sealing method and machine of the thermal impulse type.

As disclosed in my Patent No. 2,460,460, heat sealing machines of the thermal impulse type essentially comprise a pair of pressure members or bars and a reciprocating mechanism therefor whereby pressure may be applied upon two or more layers of thermoplastic film to be heat sealed interposed therebetween. Examples of the commercially most important thermoplastic films are Pliofilm (rubber hydrochloride), Vinylite (a copolymer of vinyl chloride and vinyl acetate), Polythene (polyethylene), and Saran (vinylidene chloride). A heater element in the form of a thin and narrow strip of a metal of high specific resistance, such as a suitable nickel-chromium alloy known in the trade as Nichrome, is mounted on the face of at least one of said bars, constituting the operating or sealing face of the machine. Sealing pulses of electric current may be passed through the said heater element under the control of a switching mechanism, the operation of which is coordinated to that of the reciprocating mechanism of the bars.

During the operation of the machine, operation of the switching mechanism is initiated substantially when the pressure members arrive into their pressure-applying position. A short pulse of current is then passed through the heater element, which, as a result of its low heat capacity, is heated to heat sealing temperature in a small fraction of a second. The heat thus produced is immediately transferred by surface contact to the region of the thermoplastic layers compressed between the bars, causing heat sealing thereof. A short period thereafter, the heat produced by the pulse of the current is dissipated and the seal is cooled and consolidated under pressure whereby a strong and sound seal is obtained.

Heat sealing machines of the thermal impulse type provide important advantages over the commonly used heat sealing machines in which the sealing member is continuously maintained at a constant sealing temperature. Due to the fact that the thermal impulse principle permits the sealed region to cool and to consolidate under pressure, the equality of the seal is greatly improved. Also, the thermal impulse principle makes it possible to readily seal films of materials which cannot be sealed on an industrial scale with sealing members maintained at constant sealing temperatures, such as particularly Polythene and Saran.

Although the heat sealing machines of the thermal impulse type provided excellent results and achieved remarkable commercial success within a short period after their introduction, certain practical difficulties were experienced when it was attempted to apply the thermal impulse principle for the production of seals of other than relatively simple shape. This will be readily appreciated if it is considered that the configuration of the instantaneously heated heater element determines the configuration or shape of the seal produced. Moreover, since the heater element is to be heated by passing a short pulse of an electrical current therethrough, the heater element has to define one or more current paths of a continuous character through which a current pulse of predetermined intensity and duration can pass. These requirements exclude sealing in regions corresponding to complex patterns which cannot be readily defined by lines or strips of a conductor of substantially uniform cross section and width. On the other hand, there are many practical situations where it is desired to produce sealing patterns of a widely different character, for example in the form of relatively large continuous surfaces or shapes or in the form of a number of discontinuous areas. In this respect, the impulse sealing principle was not as flexible in its operation as heat sealing with continuously heated metal bars or irons in which the sealing area was defined by raised portions or islands on the bar.

I have now discovered that the outstanding problem may be solved in a remarkably simple manner.

It is an object of the present invention to improve heat sealing machines of the thermal impulse type.

It is another object of the present invention to provide an improved heat sealing machine of the thermal impulse type which is capable of forming seals or in general bonding thermoplastic materials in regions having any desired pattern or configuration.

It is also within the contemplation of the invention to provide a novel and improved heat sealing machine which permits obtaining the well known advantages of the thermal impulse principle without being in any way restricted as to the shape of the sealing pattern or area produced.

The invention also contemplates a novel heat sealing machine of the thermal impulse type which is capable of continuously producing seals of any desired shape, pattern or configuration on thermoplastic materials or layers at a heretofore unobtainable high rate of speed.

An additional object contemplated by the present invention is the provision of a novel and improved method of bonding thermoplastic materials in accordance with any desired pattern, including patterns of the most complex configuration or design, while realizing the advantages of the thermal impulse principle.

Other and further objects and advantages of the present invention wil become apparent from the following description, taken in conjunction with the accompanying drawings, in which:

Fig. 1 is a side elevational view, somewhat diagrammatic and fragmentary in character and having parts in section, of a preferred embodiment of the present invention;

Figs. 2 to 4 are top elevational views illustrative by way of example of some of the sealing patterns or designs which are obtainable by the sealing or bonding machine of Fig. 1;

Fig. 5 is a side elevational view, having parts in section and also somewhat diagrammatic in character, of a bonding machine embodying the invention and suitable for the continuous production of repetitive sealing patterns of any desired configuration on one or more layers of thermoplastic material;

Fig. 6 is a front elevational view of the machine shown in Fig. 5;

Fig. 7 is a top elevational view of a portion of the thermoplastic layers after the sealing operation continuously carried out by the machine of Figs. 5 and 6;

Fig. 8 is a sectional view taken on lines 8—8 of Fig. 7;

Fig. 9 is a perspective view of a modified heater roll suitable for being used in the bonding machine illustrated in Figs. 5 and 6;

Fig. 10 is a top elevational view of a portion of the thermoplastic layers after the sealing operation when using the heater roll of Fig. 9; and Fig. 11 is a section taken on line 11—11 of Fig. 10.

Broadly stated, in accordance with the principles of the present invention, I provide a heater member having a heating face, the surface of which is formed in accordance with the desired sealing pattern. This member is preferably formed of metal of high heat conductivity, such as copper, brass, aluminum, and the like, and is maintained at a constant high temperature, which at least equals but in most practical cases somewhat exceeds the temperature that is required to cause heat sealing or bonding of the thermoplastic materials.

I further provide a sealing member having a generally smooth sealing face. This sealing face may be formed of a great variety of different materials, one of the principal requirements being that the material should have a relatively low heat conductivity, for reasons which will appear more clearly as the description proceeds. In general, I prefer to use metals or alloys having a definite heat conductivity, as distinguished from heat insulators, such heat conductivity, however, being only a fraction of the heat conductivity possessed by the metals considered to be good conductors of heat, such as copper, copper alloys, or aluminum. Examples of the most common materials suitable for forming the sealing face of the sealing member are Nichrome (a nickel base alloy containing 11–22% chromium and smaller amounts of silicon and manganese), Inconel (a nickel base heat- and oxidation-resistant alloy with approximately 13% chromium, 6% iron, small amounts of manganese, silicon and copper, and Nilvar (a high-nickel iron alloy with about 36% of nickel showing extremely low coefficient of temperature expansion).

In practicing the invention, the sealing member is brought into direct and intimate heat transfer relation with the heater member, for example by pressing the sealing face of the sealing member against the heating face of the heater member for a short period of time, which is generally shorter than one second. As a result of this heat transfer relation or pressure contact between the two surfaces, the heated pattern of the heating face will heat up a corresponding region or pattern on the sealing face. Due to the relatively low heat conductivity of the sealing face and as the period of contact between the two surfaces is a very short one, this heat will not spread out on the surface of the sealing member but, at least for a fraction of a second, will remain thereon in the form of distinct heated areas or islands. In other words, while there is absolutely no change in the external appearance or smooth surface of the sealing member, it will now bear areas, regions or islands of stored heat. At the first glance, it may appear strange and extremely surprising that considerable temperature gradients may exist on the surface of a single and continuous metal body, or that islands of very high sealing temperature may coexist with surrounding areas of considerably lower temperature. Practical experience with the present invention has, however, indicated that this condition is not only possible but is remarkably easy to realize as a result of the relatively low heat conductivity of the sealing face. Of course, to accomplish the objects of the present invention, the heat thus stored must be utilized as fast as possible otherwise the heated areas will gradually spread, until in a few seconds, or even faster, heat conduction in the sealing face will cause the stored heat to distribute uniformly over the entire sealing face. Also, the stored heat would be further reduced and eventually completely dissipated by radiation or by conduction into the base underlying the sealing face.

Immediately thereafter, the sealing member with the sealing heat stored in predetermined regions thereof is displaced from its contacting position with the heater member and is pressed against the thermoplastic materials or layers to be bonded or heat sealed. Thus, the stored heat will be deposited on or transferred to the corresponding regions of the layers, causing heat sealing thereof in exact correspondence with the desired sealing pattern. It is further to be noted that, since the quantity of heat stored in the said regions of the sealing face is a finite and limited one, upon performing the sealing operation most, if not all, of the sealing heat will be dissipated so that the sealed regions will be cooled and consolidated under pressure whereby a strong and very sound seal is obtained. Thus, it will be observed that the present invention makes it possible for the first time in the history of the art to extend the benefits of the thermal impulse principle to the production of seals in accordance with any desired pattern or configuration.

The invention will now be more fully described with reference to the drawings, showing certain preferred practical embodiments of the invention.

Referring now more particularly to Fig. 1 of the drawing, reference numeral 10 denotes a mounting platform or table upon which there is secured a heater member or bar 11. This heater member or bar is preferably formed of metal of high heat conductivity, such as a suitable copper alloy or aluminum and is provided with a heating face 12 corresponding in configuration to the desired sealing pattern. The heater member 11 and its heating face 12 are maintained at a constant high temperature by means of an electrical heating cartridge 13 extending through a longitudinal channel 14 provided therein. While, of course, electrical heating is in most cases the simplest expedient, the desired high temperature may be obtained by a great variety of other suitable heating means, thus by passing a heating fluid, such as steam, hot water, hot oil, or the like, through a channel provided in the heater member for this purpose.

Substantially parallel-spaced to heater member 11, there is secured on mounting tabe 10 a pressure member 15 comprising a body portion of metal having thereon a layer 16 of elastic material. Since during the operation of the machine, elastic layer 16 may be exposed to relatively high temperatures, it is desirable to form it from an elastomer which is not adversely affected by such temperatures, such as silicone rubber.

Directly above the heater and pressure members 11 and 15, there is oscillatably mounted a sealing member generally denoted by reference numeral 17. The sealing member comprises a base or body portion 18 formed of brass, aluminum or similar metal of high heat conductivity, having a layer 19 of heat insulating material mounted on the operative surface thereof. This heat insulating material is preferably of such type as to resist exposure to high temperatures, a fabric of glass fibres impregnated with a silicone resin being highly satisfactory for the purpose. Upon this layer of heat insulation there is mounted a thin layer of metal of relatively low heat conductivity 20, such as Nichrome, Inconel or Nilvar. It will be noted that metal layer 20 is in the form of a strip which is considerably wider than the width of the heat insulating layer and has its longitudinal marginal portions 21 bent up and brought into direct surface engagement with the sides of base or bar 18 with its edges secured, for example by hard soldering, to the bar as indicated at 22. The center portion 23 of metal layer 20 directly on heat insulating layer 19 constitutes the operating or sealing face of the sealing member.

Body portion 18 of sealing member 17 is carried by the lower end of an actuating rod 24, the upper end of which has a cross piece 25 secured thereto. This cross piece is slideably supported in a cut out portion or window of a metal frame 26, the intermediate portion of rod 24 being slideably supported in a channel 27 provided in the lower portion of frame 26. A compression spring 28 is located around the portion of the rod extending between cross piece 25 and the lower portion of frame 26, thereby biasing the rod and the sealing member 17 carried thereby against downward displacement. Frame 26 is oscillatably mounted around a pin or pivot 29. An actuating handle 30 is secured to an intermediate portion of actuating rod and may be grasped by an operator for actuating the machine.

From the foregoing description, the operation of the sealing machine of the invention will be readily understood by those skilled in the art. When it is desired to heat seal or bond the thermoplastic layers 31 and 32, the corresponding portions of the said layers are placed upon elastic layer 16 of pressure member 15. The operator then grasps handle 30 and swings actuating rod 24 with sealing member 17 at its lower end along an arcuate path until the sealing member arrives into cooperating position with respect to the heating face 12 of heater member 11. Then, handle 30 and the associated sealing member 17 is depressed in the radial direction until the longitudinal center zone of the sealing face 23 is brought into direct surface engagement with heating face 12 of the heater member. This will cause sealing heat to be stored in the corresponding center region of the sealing face 23.

Immediately thereafter, the sealing member 17 is permitted to be raised by the biasing effect of compression spring 28 and the sealing member is swung in the opposite arcuate direction until it arrives directly above pressure member 15 with the layers of thermoplastic material 31 and 32 thereon and is pressed down upon the said layers. The heat stored in the center region of sealing face 23 will then be deposited upon the thermoplastic layers compressed between the sealing face 23 and the pressure face 16, causing heat sealing of the layers in a region in exact correspondence with the configuration of heating face 12. Preferably, the sealing face is permitted to remain under pressure until such time as the limited amount of sealing heat stored therein is substantially dissipated whereby the seal is permitted to cool and consolidate under pressure. As is well known from the principles of thermal impulse sealing disclosed and claimed in my Patent No. 2,460,460, a seal of this type is characterized by great uniformity and high strength. Finally, handle 30 is released by the operator whereby the sealing member 17 is returned into its inoperative or rest position by spring 28. The sealed thermoplastic layers are then removed and the machine is ready for the next sealing operation.

Any residual heat that remains in the sealing face 23 is quickly carried away into the body portion 18 of the sealing member 17 where it is harmlessly dissipated by radiation and other heat losses. As the heat capacity of body portion 18 is many times greater than that of sealing face 23, this will not appreciably increase the temperature of the body portion. However, further positive cooling of the sealing member 18 may be resorted to, if desired, for example water or some other cooling fluid may be passed through a channel 33 provided in sealing member 17 for this purpose.

It is noted that the sealing face is constituted by a relatively thin layer of low heat conductivity metal, the thickness of such layer being, for example, in the order of from 0.001" to 0.01". This is desirable in view of the fact that the heat stored in the sealing layer will not spread as rapidly in a thin layer as in a thick layer. However, the preferred thickness will largely depend on the speed of operation or, in other words, on the interval between the time the heat is stored in the sealing layer and such stored heat is deposited on the thermoplastic layers to be sealed. The quicker the sealing operation is, the thicker can be the sealing layer and when the operation is extremely fast, that is when the time elapsed between the storing and the deposition of the heat in the sealing layer is very short, the sealing member may be formed as a solid integral body of metal having the described characteristics. In addition to the metals of low heat conductivity mentioned in the foregoing, there are at present numerous other materials on the market which offer special advantages for certain applications. Examples of such new materials are titanium metal and its alloys, and certain metal-ceramic combinations, such as those constituted by a molybdenum sponge impregnated by a ceramic material having a lower melting point than molybdenum.

The temperature at which the heater member 11 and its heating face 12 are maintained depends to a substantial extent on the sealing temperature of the thermoplastic layers which are to be bonded together. In general, this constant temperature is selected to be slightly higher than the desired sealing temperature due to the fact that at least some of the heat will be lost by radiation or conduction during the short interval that elapses between the time the heat is stored in the sealing face and is deposited therefrom onto the thermoplastic layers.

In Fig. 1, for the sake of simplicity, a manually operated sealing machine embodying the invention is shown. However, the same manipulations may be readily carried out in an automatic manner by means of a suitable power-driven machine, as those skilled in the art will readily understand.

Fig. 2 illustrates the heating face of the sealing member or bar shown in Fig. 1. It will be seen that this comprises a metal base or body portion 11, having a raised elongated heating face 12, in the form of a strip. This will result in the production of a narrow longitudinal seal in the thermoplastic layers which will be an exact duplicate in configuration of that of the heating face 12. It is to be remembered, however, that even though the sealing operation is carried out with great rapidity and the heat conductivity of the sealing layer is rather low, some slight spreading of the heat stored in the sealing face 23 will be practically unavoidable so that the actual seal will be a little wider than the width of heating face 12.

Figs. 3 and 4 illustrate heating bars having raised heating faces of different configuration. Thus, the heater bar of Fig. 3 has a heating face 12a in the form of a wavy line, while the heater bar of Fig. 4 has a heating face comprising a plurality of raised annular islands 12b and produces a seal which is found useful, for example, when sealing small articles, such as pills, between two superposed strips of thermoplastic material. Of course, there is absolutely no limitation as to the pattern that may be given to the heating face of the heater member, the produced seal will always faithfully follow the configuration or pattern of the heating face, this being one of the important advantages of the present invention.

Other important advantages are obtained when the principles of the present invention are applied to continuously operated machines capable of high speed operation. A machine of the described character is diagrammatically illustrated in Figs. 5 and 6.

The continuously operated heat sealing machine of the invention essentially comprises a heater roll 41, a sealing roll 42, and a pressure roll 43. Heater roll 41 comprises a generally star-shaped body portion 44 of brass or some other metal of high heat conductivity, the exposed circumferential portions 45 of which constitute the operative or heating face of the roll. This body portion is adapted to be heated to a desired sealing temperature by any suitable heating means, such as an electrical heating element or, as shown in the drawing for the sake of simplicity, by passing a suitable heating fluid, such as steam, through an inner axial channel 46 thereof. The heating fluid is introduced through an intake conduit 47 under the control of a valve 48 and is discharged through an outlet conduit 49. The rest of the circumferential surface of heater roll 41 is constituted by heat insulating material 50 capable of resisting the high sealing temperatures, such as a ceramic material or certain synthetic resins containing an inorganic filler. Heater roll 41 is rotatably supported on a hollow shaft 51 which at the same time also serves for the introduction and discharge of the heating fluid.

Sealing roll 42 comprises a body portion 52 of metal, rotatably supported on a shaft 53. On the circumferential surface of this body portion there is provided a layer of heat insulation 54, such as one formed of a glass fibre fabric impregnated with silicone resin. On this layer of heat insulation there is a thin layer of metal 55 of relatively low heat conductivity, such as Nichrome, Inconel, Nilvar, or the like, which constitutes the operative or sealing face of the roll. While in most cases it is preferred to form the sealing roll with a relatively thin sealing layer of low conductivity metal, such as one having a thickness between 0.01″ and 0.001″, in order to prevent spreading of the heat stored therein, in some cases, particularly when operation at very high speeds is desired, it is satisfactory and even advantageous to form the entire sealing roll of a solid body of suitable metal.

Underneath the sealing roll 42 there is mounted a pressure roll 43 comprising a body portion 56 of metal mounted for rotation around shaft 57 and bearing a circumferential layer 58 of elastic material, such as a suitable grade of silicone rubber which constitutes the pressure face of the roll. Preferably, suitable means are provided for urging the pressure roll towards the sealing roll, such biasing means being diagrammatically indicated by means of a compression spring 59.

The heater, sealing and pressure rolls 41, 42, 43 are maintained in continuous rotation by suitable driving means which in the simplest case may be in the form of a motor having its pulley 60 in frictional engagemen with the circumferential surface of the heater roll 41. This will cause rotation of sealing roll 42 and of pressure roll 43, which are in rolling engagement with each other. Arrows indicate the direction of rotation of the several rolls during their cooperation.

When it is desired to produce seals by the machine of the invention, the thermoplastic layers 61 and 62 are introduced into the bight of sealing roll 42 and pressure roll 43, the said layers being constituted in the illustrated case by a flattened tube 63 of the thermoplastic material, shown in Figs. 7 and 8. Each time when one of the heating faces 45 of heater roll 41 is brought into rolling contact with the circumferential sealing face 55 of sealing roll 42, heat is stored in the said sealing face in regions which are in substantial correspondence with the surface configuration of the heating faces. During continued rotation of the sealing roll, these preheated areas of the sealing face of sealing roll 42 are brought into rolling pressure contact with corresponding areas of the thermoplastic layers 61 and 62, whereby the stored heat is deposited thereon, causing heat sealing thereof in areas of the same configuration. Since the amount of heat stored in the said areas is limited, most, if not all of it is dissipated in the production of the seal so that the seal is permitted to cool and to consolidate under pressure thus producing a strong and sound seal. As it will be best observed in Fig. 7, the finished product emerging from the bight of rolls 42 and 43 will display a repetitive sealing pattern 64 which is in exact correspondence with the configuration of heating faces 45 on heater roll 41. Of course, any desired sealing pattern may be obtained simply by changing the configuration of the heating faces 45 present on the heater roll.

It will be noted that heater roll 41 in Fig. 5 is characterized by a continuous smooth circumferential surface, part of which is constituted by metal heating faces 45 and the remainder by a heat insulator 50. It is also possible, however, to employ a modified heater roll 70, such as is shown in Fig. 9, in which the heating face is represented by raised surface portions or islands 71, while the balance of the surface, where no heating is desired, is represented by depressed portion 72. In many cases a heating roll of this type is more advantageous for the production of complex sealing patterns.

Fig. 10 illustrates the sealing pattern that is obtained by the use of the heating roll of Fig. 9. Reference numerals 81 and 82 denote two independent layers of films of thermoplastic material and 83 denotes the sealed area which defines a plurality of individually sealed pockets 84. Obviously, any other type of sealing pattern including patterns of great complexity may be produced by the bonding machine of the invention without any difficulty.

During the operation of the heat sealing machine shown in Figs. 5 and 6, after the heat stored in sealing face 55 has been deposited onto thermoplastic layers 61 and 62, any residual heat remaining in the sealing face will be conducted away into the metal body 52 of the sealing roll where it will be harmlessly dissipated due to the relatively large heat capacity of the said metal body as compared to the small heat capacity of the sealing face. This desirable condition of operation may be assured by properly correlating the temperature of the heating faces 45 to the speed of rotation of the several rolls and to the amount of heat that is required for sealing the thermoplastic layers 61 and 62. However, particularly at very high speeds of operation, there may be gradual build-up of heat in metal body 52 or in sealing face 55 of the sealing roll. To counteract this tendency, positive cooling of metal body 52 may be provided for example by forming an axial cavity therein and passing water or some other suitable cooling fluid through such cavity at a controlled rate. Another expedient, which is even more effective, is to provide a cooling roll, maintained at a constant low temperature by the passage of a cooling fluid therethrough, and to bring the circumferential surface of such cooling roll with the sealing face 55 at a suitable location between the point where the stored heat is deposited onto the thermoplastic layers and the point where sealing heat is again stored in said sealing face by its contact with one of heating faces 45. A cooling roll of the described character is diagrammatically indicated at 65 in Fig. 5 and is effective in "wiping off" the residual heat from sealing face 55 and to condition it to a uniform low temperature before a fresh sealing pattern is stored therein.

It will be noted that the present invention provides numerous advantages of which the most important are the following:

1. It is possible to extend the advantages of the thermal impulse principle, that is sealing with a short and highly intense heat pulse and cooling the seal under pressure, without any limitations as to the shape or patterns of the seal produced.

2. Extremely complex and diversified sealing patterns can be produced, such as have been impossible to obtain heretofore by any sealing method or machine.

3. Films which are extremely difficult or impossible to seal by conventional procedures, such as Polyethylene and Saran, are sealed with great facility.

4. The sealing pattern may be readily changed simply by changing the pattern of the heater face without the necessity of changing any other element of the mahcine so that the same machine can be utilized to produce an endless variety of sealing patterns.

5. In the sealing face, hot sealing regions defining the sealing patterns coexist with adjoining cool areas in one and the same completely smooth surface. Thus, while the areas to be sealed are heated, the adjoining areas are cooled in the complete absence of any extrusion of the films in the lines defining the hot areas from the cold areas. This is one of the essential requirements of the production of a perfect seal.

6. The method of the invention can be carried out continuously and for this reason it is readily adaptable to continuously operated heat sealing, bagmaking, wrapping and packaging machines.

7. Particularly when carrying out the method of the invention in a continuous manner, extremely high operating speeds may be obtainead.

Although the present invention has been described in connection with a few preferred embodiments thereof, variations and modifications may be resorted to by those skilled in the art without departing from the principles of the invention. I consider all of these variations and modifications to be within the true spirit and scope of the present invention, as disclosed in the foregoing description and defined by the appended claims.

What is claimed is:

1. In a machine for heat sealing thermoplastic layers, the combination which comprises a sealing member having a smooth sealing face, a heater member having a raised heating face defining a predetermined pattern of an area smaller than that of said sealing face, and means for sequentially bringing said sealing face into pressure contact with said heating face in the absence of sliding displacement of said faces with respect to each other during such contact to form on the sealing face a heated pattern of restricted area and then into pressure contact with the layers to be sealed to form thereon a corresponding sealed pattern.

2. In a machine for heat sealing thermoplastic layers, the combination which comprises a sealing member having a sealing face, a heater member having a heating face defining a predetermined pattern of an area smaller than that of said sealing face and maintained at sealing temperature, and means for sequentially bringing said sealing face into pressure contact with said heating face in the absence of sliding displacement of said faces with respect to each other during such contact to form on the sealing face a heated pattern of restricted area and then into pressure contact with the layers to be sealed to form thereon a corresponding sealed pattern, said sealing member comprising a metal base, a layer of heat insulation thereon, and a metal layer of lower heat conductivity than said base on said layer of insulation and constituting said sealing face.

3. In a machine for heat sealing thermoplastic layers, the combination which comprises an elongated metal sealing bar, a thin layer of heat insulation on said bar, and a thin strip of metal of lower heat conductivity than the metal of said base on said layer of insulation and constituting the sealing face of said bar, said strip of metal having its longitudinal marginal regions directly secured to said bar; a heater bar having a heating face defining a predetermined pattern and maintained at a constant sealing temperature; and means for sequentially bringing said sealing face into pressure contact with said heating face and with the thermoplastic layers to be sealed.

4. In a machine for heat sealing thermoplastic layers, the combination which comprises a sealing roll, a heater roll mounted for rolling contact with said sealing roll, said heater roll having on its circumferential surface a predetermined pattern of an area smaller than that of such surface maintained at sealing temperature thereby transferring to and storing sealing heat in the corresponding contacting regions of the sealing roll during rotation of said rolls while maintaining the remainder of said sealing roll below sealing temperature, and a pressure roll mounted for cooperation with said sealing roll for passing the thermoplastic layers in rolling pressure contact with said sealing roll having both heated and unheated regions thereby to deposit such stored heat on said layers and to cause heat sealing thereof in correspondence with said heated regions.

5. In a machine for heat sealing thermoplastic layers, the combination which comprises a sealing roll, a heater roll mounted for rolling contact with said sealing roll, said heater roll having on its circumferential surface a predetermined pattern of an area smaller than that of such surface maintained at sealing temperature, a pressure roll mounted for cooperation with said sealing roll for passing the thermoplastic layers to be sealed in pressure contact with said sealing roll, and means for rotating said rolls whereby sealing heat will be continuously stored in restricted regions of said sealing roll in correspondence with said pattern while maintaining the remainder of said roll below sealing temperature and said heated pattern surrounded by unheated regions will be continuously deposited on said thermoplastic layers causing heat sealing thereof in correspondence with said pattern.

6. In a machine for heat sealing thermoplastic layers, the combination which comprises a sealing roll including a cylindrical body portion of metal, a layer of heat insulation thereon, and a layer of metal of lower heat conductivity than the metal of the body portion on said layer of insulation and constituting the sealing face of said roll; a heater roll mounted for rolling contact with said sealing roll, said heater roll having on its circumferential surface a predetermined pattern of an area smaller than that of such surface maintained at sealing temperature; a pressure roll mounted for cooperation with said sealing roll for passing the thermoplastic layers to be sealed in pressure contact with said sealing roll; and means for rotating said rolls.

7. In a machine for heat sealing thermoplastic layers, the combination which comprises a sealing roll, a heater roll mounted for rolling contact with said sealing roll, said heater roll having on its circumferential surface a predetermined pattern of an area smaller than that of such surface maintained at sealing temperature thereby transferring to and storing sealing heat in the corresponding restricted contacting regions of the sealing roll during rotation of said rolls while maintaining the remainder of said sealing roll below sealing temperature, a pressure roll mounted for cooperation with said sealing roll for passing the thermoplastic layers in rolling pressure contact with the preheated regions of said sealing roll surrounded by unheated regions thereby to deposit said stored heat on said layers and to cause heat sealing thereof in said preheated regions, a cooling roll maintained at a constant low temperature in rolling contact with the portions of the sealing roll from which the stored sealing heat has been already deposited to withdraw any residual heat therefrom, and means for rotating said rolls.

8. The method of heat sealing thermoplastic layers which comprises bringing a sealing roll into rolling contact with a heater roll having a zone of predetermined configuration thereof maintained at sealing temperature in the absence of sliding displacement of said rolls with respect to each other during such contact thereby to store sealing heat in a corresponding zone of the surface of the sealing roll while maintaining the remaining zone of said surface below sealing temperature, and then bringing the surface of said sealing roll including both preheated and unheated zones into rolling contact with the layers to be sealed thereby to deposit said stored heat on said layers and to cause heat sealing of the layers in a corresponding zone.

9. The continuous method of heat sealing thermoplastic layers which comprises progressively bringing successive surface portions of a sealing roll into rolling contact with corresponding surface portions of a heater roll having a zone of predetermined configuration thereof maintained at a constant sealing temperature in the absence of sliding displacement of said surface portions with respect to each other during such contact thereby to store sealing heat in a corresponding zone on the surface of the sealing roll while maintaining the remaining zone of said surface below sealing temperature, progressively bringing successive surface portions of said sealing roll including both preheated and unheated zones into rolling contact with the layers to be sealed thereby to deposit said stored heat on said layers and to cause heat sealing of the layers in a corresponding zone, and so adjusting the rate of rotary displacement of said sealing roll that the heat is stored thereon and is deposited therefrom without appreciable spreading of the sealing zone.

10. In a machine for bonding layers of thermoplastic material, the combination which comprises a heater member, a sealing member, said heater member having a heated surface of smaller area than the surface area of said sealing member, and means for sequentially bringing the surface of said sealing member into heat transfer relation with the heated surface of said heater member and with said thermoplastic layers in the absence of sliding displacement between said surfaces during such heat transfer thereby to cause first storage of bonding heat in restricted regions of the sealing member and then deposition of such heat and bonding of said layers in corresponding restricted regions.

11. The method of heat sealing thermoplastic layers which comprises bringing a sealing roll into rolling contact with a heater roll having a zone of predetermined configuration thereof maintained at sealing temperature in the absence of sliding displacement between said rolls during such contact thereby to store sealing heat in a corresponding zone of the surface of the sealing roller while maintaining the remaining zone of said surface below sealing temperature, bringing the surface of said sealing roll including both preheated and unheated zones into rolling contact with the layers to be sealed thereby to deposit said stored heat on said layers and to cause heat sealing of the layers in a corresponding zone, and then bringing the surface of said sealing roll into rolling contact with the surface of a cooling roll to withdraw residual heat from such surface.

References Cited in the file of this patent

UNITED STATES PATENTS

| | | |
|---|---|---|
| 2,107,249 | Hepke | Feb. 1, 1938 |
| 2,433,643 | Beach et al. | Dec. 30, 1947 |
| 2,451,728 | Gardner et al. | Oct. 19, 1948 |
| 2,469,972 | Lowry et al. | May 10, 1949 |
| 2,509,439 | Langer | May 30, 1950 |
| 2,525,356 | Hoyler | Oct. 10, 1950 |
| 2,542,901 | Chaffee | Feb. 20, 1951 |
| 2,556,008 | Spalding | June 5, 1951 |
| 2,556,452 | Spalding | June 12, 1951 |
| 2,574,094 | Fener et al. | Nov. 6, 1951 |
| 2,621,139 | Messing | Dec. 9, 1952 |